US008769581B2

(12) United States Patent
Chapman et al.

(10) Patent No.: US 8,769,581 B2
(45) Date of Patent: Jul. 1, 2014

(54) BACKWARDS COMPATIBLE REAL-TIME PROGRAM GUIDE CAPACITY INCREASE

(75) Inventors: Lawrence N. Chapman, Palos Verdes Estates, CA (US); Stephen P. Dulac, Santa Clarita, CA (US); Robert G. Arsenault, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 752 days.

(21) Appl. No.: 12/511,824

(22) Filed: Jul. 29, 2009

(65) Prior Publication Data

US 2009/0293087 A1 Nov. 26, 2009

Related U.S. Application Data

(63) Continuation of application No. 09/726,367, filed on Nov. 29, 2000, now abandoned.

(51) Int. Cl.
| | |
|---|---|
| G06F 3/00 | (2006.01) |
| G06F 13/00 | (2006.01) |
| H04N 5/445 | (2011.01) |
| H04N 21/2665 | (2011.01) |
| H04N 21/462 | (2011.01) |
| H04N 21/61 | (2011.01) |

(52) U.S. Cl.
CPC ....... *H04N 21/2665* (2013.01); *H04N 21/4622* (2013.01); *H04N 21/6143* (2013.01)
USPC ................. 725/48; 725/49; 725/54

(58) Field of Classification Search
CPC .......... H04N 21/4622; H04N 21/6143; H04N 21/2665

USPC ...................................... 725/48, 49
See application file for complete search history.

(56) References Cited

U.S. PATENT DOCUMENTS

| | | | | |
|---|---|---|---|---|
| 5,666,645 A | * | 9/1997 | Thomas et al. | 725/47 |
| 5,828,945 A | * | 10/1998 | Klosterman | 455/42 |
| 5,844,636 A | * | 12/1998 | Joseph et al. | 375/240.26 |
| 5,867,207 A | * | 2/1999 | Chaney et al. | 725/54 |
| 5,946,045 A | * | 8/1999 | Ozkan et al. | 725/54 |
| 6,133,910 A | * | 10/2000 | Stinebruner | 725/49 |
| 6,434,384 B1 | * | 8/2002 | Norin et al. | 455/429 |
| 7,587,736 B2 | * | 9/2009 | Summers et al. | 725/95 |

\* cited by examiner

*Primary Examiner* — Pankaj Kumar
*Assistant Examiner* — Usha Raman

(57) ABSTRACT

A system and method for transmitting program guide information describing a second set of programs to subscribers is disclosed. In one embodiment, the method is implemented in a network broadcasting a first signal having a first set of programs and a second signal having a second set of programs. The method comprises the steps of broadcasting first program guide information describing the first set of programs to the subscribers on a first service channel on a first signal and broadcasting second program guide information describing the second set of programs to a subset of the subscribers on the first service channel on a second signal, wherein a fundamental signal characteristic of the second signal differs from the fundamental signal characteristic of the first signal. In another embodiment, the method comprises the steps of receiving first program guide information describing the first set of programs on a first service channel on a first signal; and receiving second program guide information describing the second set of programs on the first service channel on a second signal, wherein a fundamental signal characteristic of the second signal differs from the fundamental signal characteristic of the first signal.

38 Claims, 11 Drawing Sheets

FIG. 7

| CONUS MPG CONTENT | | SPOT BEAM MPG CONTENT | |
|---|---|---|---|
| SIGNAL/SCID | DESCRIPTION | SIGNAL/SCID | DESCRIPTION |
| FIRST /10 | PROGRAM 1 | FIRST /10 | PROGRAM 1 |
| . | PROGRAM 2 | . | PROGRAM 2 |
| . | PROGRAM 3 | . | PROGRAM 3 |
| . | PROGRAM 4 | . | PROGRAM 4 |
| FIRST 0X499 | PROGRAM N | FIRST 0X499 | PROGRAM N |
| SECOND 0X49A | PROGRAM N+1 | SECOND 0X49A | LOCAL PROGRAM 1 |
| . | PROGRAM N+2 | . | . |
| . | PROGRAM N+3 | . | . |
| SECOND/0X4FF | PROGRAM M | SECOND/0X4FF | LOCAL PROGRAM 101 |
| | | | |
| | | | |

BACKWARDS COMPATIBLE REAL-TIME PROGRAM GUIDE CAPACITY INCREASE

CROSS-REFERENCE TO RELATED APPLICATIONS

This application is a continuation of prior application No. Ser. 09/726,367, filed Nov. 29, 2000, entitled "BACKWARDS COMPATIBLE REAL-TIME PROGRAM GUIDE CAPACITY INCREASE," by Lawrence N. Chapman, Stephen P. Dulac, and Robert G. Arsenault, which application is hereby incorporated by reference herein.

BACKGROUND OF THE INVENTION

1. Field of the Invention

The present invention relates to systems and methods for providing video program material to subscribers, and in particular to a method and system for providing program guides with increased capacity to accommodate descriptions of local channel content.

2. Description of the Related Art

Television programs are distributed to viewers by a variety of broadcasting methods. These methods include traditional analog broadcast television (National Television Systems Committee or "NTSC" standard), the upcoming digital broadcast television (Advanced Television Systems Committee or "ATSC" standard), cable television (both analog and digital), satellite broadcasting (both analog and digital), as well as other methods. These methods allow channels of television content to be multiplexed and transmitted over a common transmission medium.

In recent years, there has been an increasing demand for video distribution systems to provide more program channels. In digital satellite systems, this may be accomplished in many ways. One way of increasing the number of available channels is to increase the compression or decrease the error correction provided in the broadcast signal of existing satellites. Another way of increasing the number of available channels is to increase the bandwidth of the downlink from the satellite to the subscribers' receivers. Unfortunately, this technique is difficult to accomplish with existing (legacy) satellites and in a way that is compatible with existing (legacy) receivers.

As a result, video distribution systems have evolved to include additional satellites to broadcast additional program material to subscribers. Typically, satellites broadcasting these enhanced services are deployed in geosynchronous orbits in orbital locations proximate to those of the legacy satellites. This allows a single antenna to receive signals from both satellites with little or no physical scanning.

Electronic program guides for television programming are known in the art. Such program guides typically include a viewer channel number that identifies the stream of television content offered by a content provider and a description of each media program associated with the channel number. Program guide information is typically transmitted along with the television content, and typically also includes schedule information for display on users' televisions. The schedule information informs users what television programs are currently on, and what television programs will be shown in the near future.

Until recently, satellite-based video distribution systems were prohibited by regulation from transmitting local programs to subscribers within areas where those local programs were locally available by conventional broadcast means. For example, one of the network affiliates for the American Broadcasting Company in Los Angeles is KABC. These regulations prohibited satellite-based video distribution systems from re-transmitting the KABC broadcast to subscribers in the same market area serviced by the regional broadcast affiliate, KABC. These limitations, however, were eliminated by Congress through the Satellite Home Viewing Improvement Act (SHIVA). Satellite-based video distribution systems can now transmit such "local content" to subscribers within the market areas serviced by the original broadcast provider.

While this capability enhances the desirability of a satellite-based video distribution system, it raises a number of difficulties. First, there are a large number of local market areas, each with a large number of channels. In Los Angeles, for example, there are seven local content providers broadcasting on very high frequencies (VHF) and more than a dozen local content providers broadcasting on ultra high frequencies (UHF). Providing local content to subscribers in all market areas places large demands on transmission bandwidth. The transmission of program guide information describing the local content is also problematic. To serve dozens of local market areas, each with many channels, program guide information for literally hundreds of local content programs would be required. Each subscriber's receiver could be overwhelmed with information about channels that it cannot or should not receive.

Further, there are literally millions of satellite broadcast receivers in service. While it is possible to present local program guide information by updating or replacing these satellite broadcast receivers, this cannot be accomplished without incurring substantial (and prohibitive) costs.

What is needed is a method and apparatus for providing local program guide information to media subscribers in designated areas. It is also necessary that the method and apparatus be compatible with existing satellite broadcast receivers. The present invention satisfies that need.

SUMMARY OF THE INVENTION

In summary, the present invention describes a system and method for transmitting program guide information describing a second set of programs to subscribers. In one embodiment, the method is implemented in a network broadcasting a first signal having a first set of programs and a second signal having a second set of programs. The method comprises the steps of broadcasting first program guide information describing the first set of programs to the subscribers on a first service channel on a first signal; and broadcasting second program guide information describing the second set of programs to a subset of the subscribers on the first service channel on a second signal, wherein a fundamental signal characteristic of the second signal differs from the fundamental signal characteristic of the first signal. In another embodiment, the method comprises the steps of receiving first program guide information describing the first set of programs on a first service channel on a first signal; and receiving second program guide information describing the second set of programs on the first service channel on a second signal, wherein a fundamental signal characteristic of the second signal differs from the fundamental signal characteristic of the first signal.

BRIEF DESCRIPTION OF THE DRAWINGS

Referring now to the drawings in which like reference numbers represent corresponding parts throughout:

FIG. 7 is a mapping showing a relationship between service channels program content for the first and second signals;

DETAILED DESCRIPTION OF PREFERRED EMBODIMENTS

In the following description reference is made to the accompanying drawings which form a part hereof and which show, by way of illustration, several embodiments of the present invention. It is understood that other embodiments may be utilized and structural changes may be made without departing from the scope of the present invention.

Video Distribution System

Figure 1:
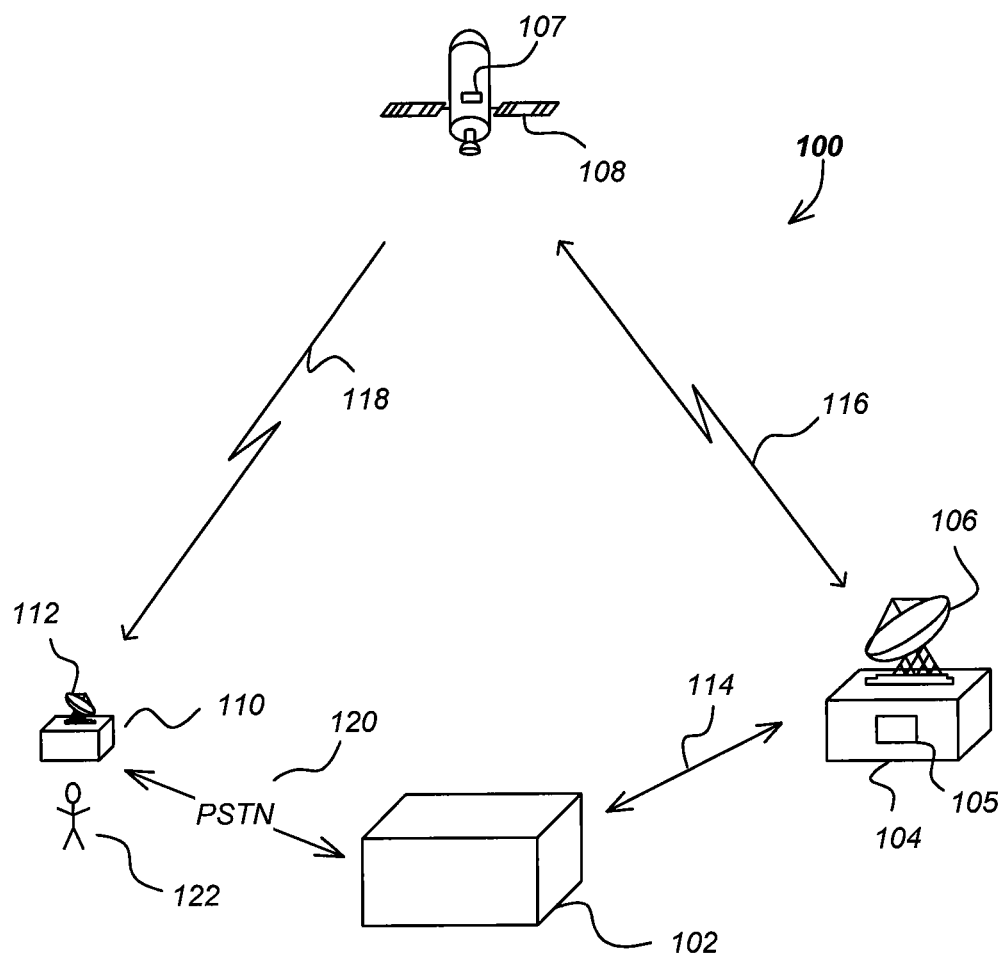
FIG. 1 is a diagram showing an overview of a video distribution system.

FIG. 1 is a diagram illustrating an overview of a single satellite video distribution system 100. The video distribution system 100 comprises a control center 102 in communication with an uplink center 104 via a ground or other link 114 and with a subscriber receiver station 110 via a public switched telephone network (PSTN) or other link 120. The control center 102 provides program material (e.g. video programs, audio programs and data) to the uplink center 104 and coordinates with the subscriber receiver stations 110 to offer, for example, pay-per-view (PPV) program services, including billing and associated decryption of video programs.

The uplink center receives program material and program control information from the control center 102, and using an uplink antenna 106 and transmitter 105, transmits the program material and program control information to the satellite 108. The satellite receives and processes this information, and transmits the video programs and control information to the subscriber receiver station 110 via downlink 118 using transmitter 107. The subscriber receiving station 110 receives this information using the outdoor unit (ODU) 112, which includes a subscriber antenna and a low noise block converter (LNB).

In one embodiment, the subscriber receiving station antenna is an 18-inch slightly oval-shaped Ku-band antenna. The slight oval shape is due to the 22.5 degree offset feed of the LNB (low noise block converter) which is used to receive signals reflected from the subscriber antenna. The offset feed positions the LNB out of the way so it does not block any surface area of the antenna minimizing attenuation of the incoming microwave signal.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscriber receiving stations 110. Using data compression and multiplexing techniques the channel capabilities, two satellites 108 working together can receive and broadcast over 150 conventional (non-HDTV) audio and video channels via 32 transponders.

While the invention disclosed herein will be described with reference to a satellite-based video distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber 122 is video (and audio) program material such as a movie, the foregoing method can be used to deliver program material comprising purely audio information or other data as well.

Uplink Configuration

Figure 2:
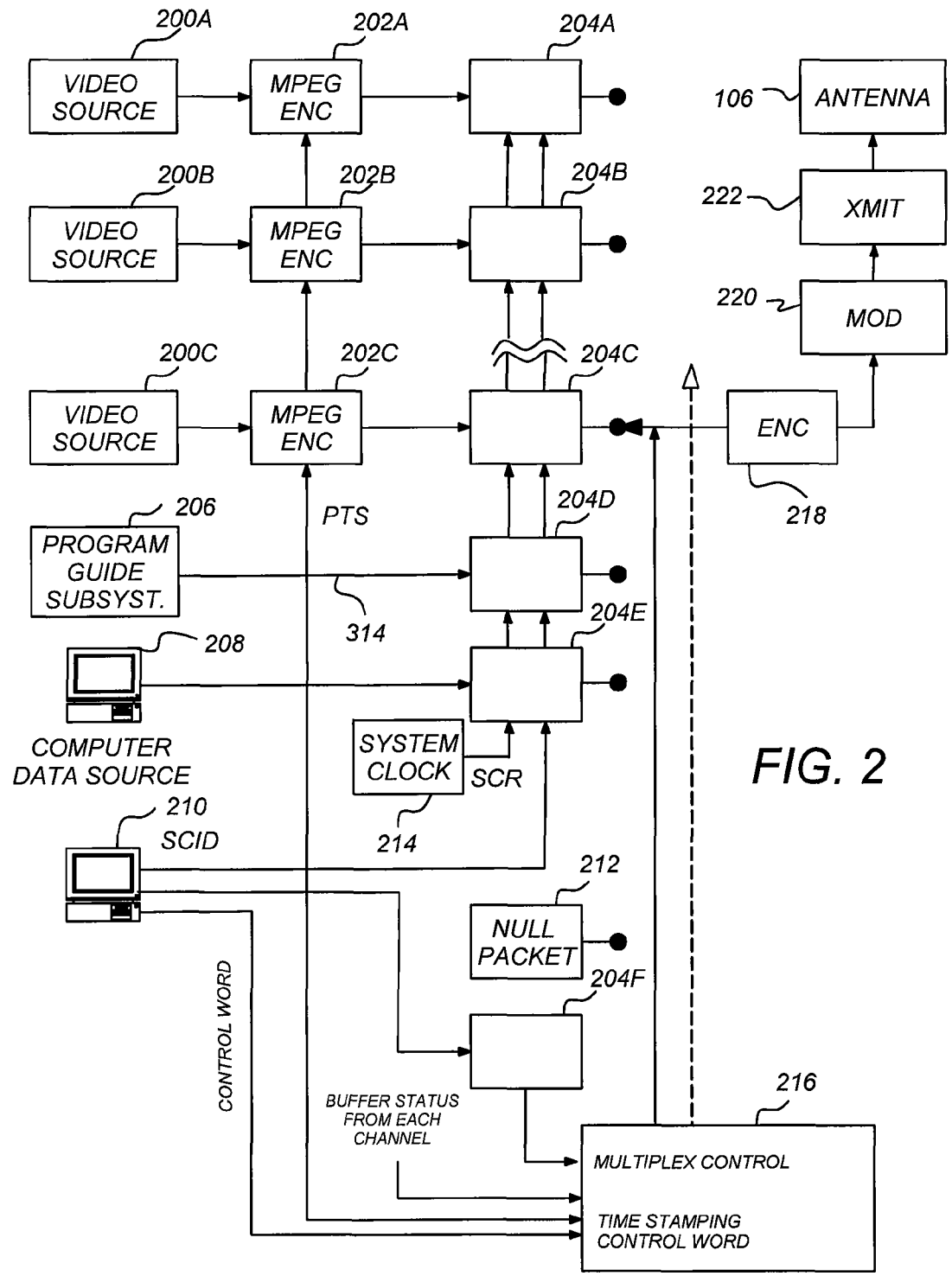
FIG. 2 is a block diagram showing a typical uplink configuration showing how video program material is uplinked to a satellite for transmission to subscribers using a single transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), a data channel from a program guide subsystem 206 and computer data information from a computer data source 208.

The video channels are provided by a program source of video material 200A-200C (collectively referred to hereinafter as video source(s) 200). The data from each video program source 200 is provided to an encoder 202A-202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F (collectively referred to hereinafter as packetizer(s) 204) associated with each source 200.

The data packets are assembled using a reference from the system clock 214 (SCR), and from the conditional access manager 210, which provides the SCID to the packetizers 204 for use in generating the data packets. These data packets are then multiplexed into serial data and transmitted.

Program Guide Subsystem

Figure 3:
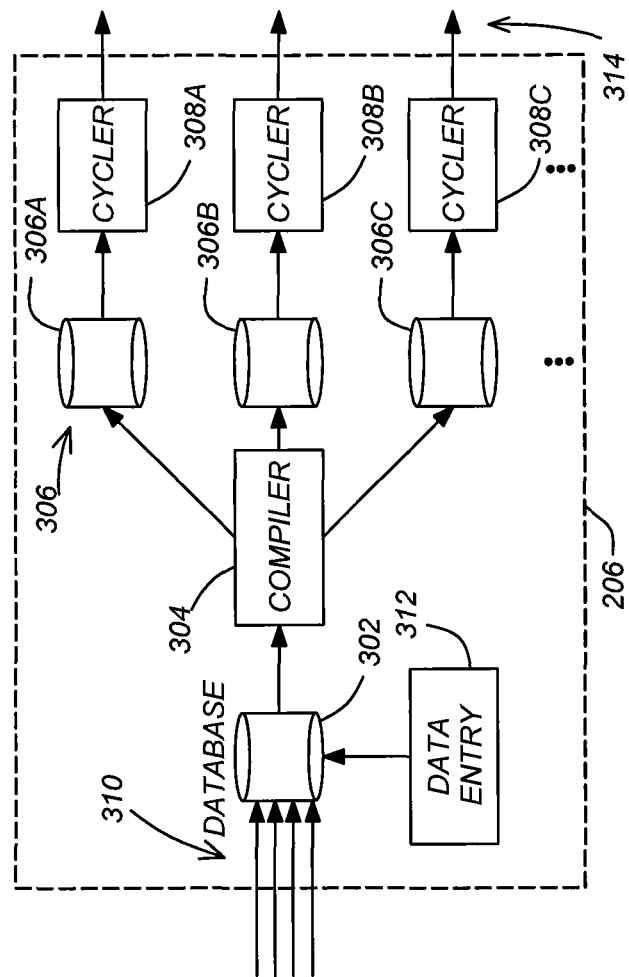
FIG. 3 is a block diagram of one embodiment of the program guide subsystem.

FIG. 3 is a block diagram of one embodiment of the program guide subsystem 206. The program guide data transmitting system 206 includes program guide database 302, compiler 304, sub-databases 306A-306C (collectively referred to as sub-databases 306) and cyclers 308A-308C (collectively referred to as cyclers 308).

Schedule feeds 310 provide electronic schedule information about the timing and content of various television channels, such as that found in television schedules contained in newspapers and television guides. Schedule feeds 310 preferably include information from one or more companies that specialize in providing schedule information, such as GNS, TRIBUNE MEDIA SERVICES, and T.V. DATA. The data provided by companies such as GNS, TRIBUNE MEDIA SERVICES and T.V. DATA are typically transmitted over telephone lines to program guide database 302. These companies provide television schedule data for all of the television stations across the nation plus the nationwide channels, such as SHOWTIME, HBO, and the DISNEY CHANNEL. The specific format of the data that are provided by these companies varies from company to company. Program guide database 302 preferably includes schedule data for television channels across the entire nation including all nationwide channels and local channels, regardless of whether the channels are transmitted by the transmission station.

Program guide database 302 is a computer-based system that receives data from schedule feeds 310 and organizes the data into a standard format. Compiler 304 reads the standard form data out of program guide database 302, identifies common schedule portions, converts the program guide data into the proper format for transmission to users (specifically, the program guide data are converted into objects as discussed below) and outputs the program guide data to one or more of sub-databases 306.

Program guide data can also be manually entered into program guide database 302 through data entry station 312. Data entry station 312 allows an operator to enter additional scheduling information, as well as combining and organizing data supplied by the scheduling companies. As with the computer organized data, the manually entered data are converted by the compiler into separate objects and sent to one or more of sub-databases 306.

The program guide objects are temporarily stored in sub-databases 306 until cyclers 308 request the information. Each of cyclers 308 may transmit objects at a different rate than the other cyclers 308. For example, cycler 308A may transmit objects every second, while cyclers 308B and 308C may transmit objects every 5 seconds and every 10 seconds, respectively.

Since the subscriber's receivers may not always be on and receiving and saving objects, the program guide information is continuously re-transmitted. Program guide objects for programs that will be shown in the next couple of hours are sent more frequently than program guide objects for programs that will be shown later. Thus, the program guide objects for the most current programs are sent to a cycler 308 with a high rate of transmission, while program guide objects for later programs are sent to cyclers 308 with a lower rate of transmission. One or more of the data outputs 314 of the cyclers 308 are forwarded to the packetizer of a particular transponder, as depicted in FIG. 2.

It is noted that the uplink configuration depicted in FIG. 2 and the program guide subsystem depicted in FIG. 3 can be implemented by one or more hardware modules, one or more software modules defining instructions performed by a processor, or a combination of both.

Broadcast Data Stream Format and Protocol

Figure 4A:
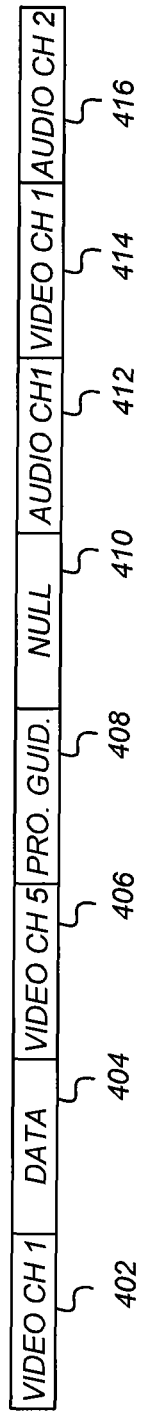
FIG. 4A is a diagram of a representative data stream received from a satellite.

FIG. 4A is a diagram of a representative data stream. The first packet segment 402 comprises information from video channel 1 (data coming from, for example, the first video program source 200A). The next packet segment 404 comprises computer data information that was obtained, for example from the computer data source 208. The next packet segment 406 comprises information from video channel 5 (from one of the video program sources 200). The next packet segment 408 comprises program guide information such as the information provided by the program guide subsystem 206. As shown in FIG. 4A, null packets 410 created by the null packet module 410 may be inserted into the data stream as desired.

The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106. The receiver 500 receives these signals, and using the SCID, reassembles the packets to regenerate the program material for each of the channels.

Figure 4B:
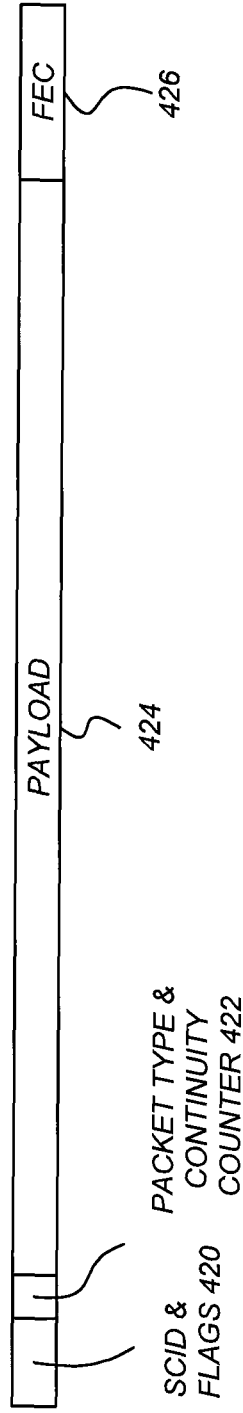
FIG. 4B is a diagram illustrating the structure of a data packet.

FIG. 4B is a diagram of a data packet. Each data packet (e.g. 402-416) is 147 bytes long, and comprises a number of packet segments. The first packet segment 420 comprises two bytes of information containing the SCID and flags. The SCID is a unique 12-bit number that uniquely identifies the data packet's data channel. The flags include 4 bits that are used to control other features. The second packet segment 422 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 424 comprises 127 bytes of payload data, which in the cases of packets 402 or 406 is a portion of the video program provided by the video program source 200. The final packet segment 426 is data required to perform forward error correction.

Integrated Receiver/Decoder

Figure 5:
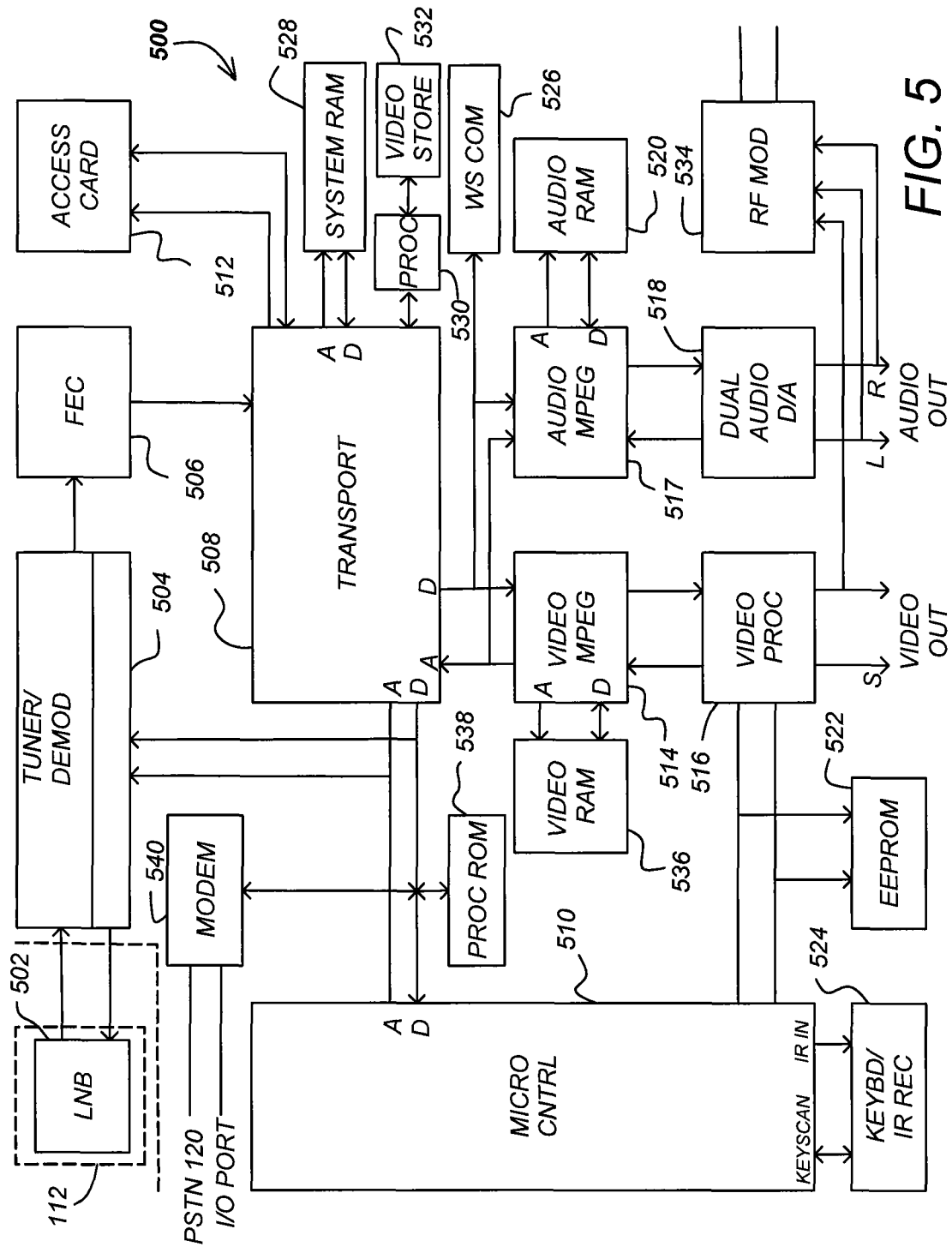
FIG. 5 is a block diagram of one embodiment of an integrated receiver/decoder.

FIG. 5 is a block diagram of an integrated receiver/decoder (IRD) 500 (also hereinafter alternatively referred to as receiver 500). The receiver 500 comprises a tuner/demodulator 504 communicatively coupled to an ODU 112 having one or more LNBs 502. The LNB 502 converts the 12.2- to 12.7 GHz downlink 118 signal from the satellites 108 to, e.g., a 950-1450 MHz signal required by the IRD's 500 tuner/demodulator 504. The LNB 502 may provide either a dual or a single output. The single-output LNB 502 has only one RF connector, while the dual output LNB 502 has two RF output connectors and can be used to feed a second tuner 504, a second receiver 500, or some other form of distribution system.

The tuner/demodulator 504 isolates a single, digitally modulated 24 MHz transponder, and converts the modulated data to a digital data stream. The digital data stream is then supplied to a forward error correction (FEC) decoder 506. This allows the IRD 500 to reassemble the data transmitted by the uplink center 104 (which applied the forward error correction to the desired signal before transmission to the subscriber receiving station 110) verifying that the correct data signal was received, and correcting errors, if any. The error-corrected data may be fed from the FEC decoder module 506 to the transport module 508 via an 8-bit parallel interface.

The transport module 508 performs many of the data processing functions performed by the IRD 500. The transport module 508 processes data received from the FEC decoder module 506 and provides the processed data to the video MPEG decoder 514 and the audio MPEG decoder 517. In one embodiment of the present invention, the transport module, video MPEG decoder and audio MPEG decoder are all implemented on integrated circuits. This design promotes both space and power efficiency, and increases the security of the functions performed within the transport module 508. The transport module 508 also provides a passage for communications between the microcontroller 510 and the video and audio MPEG decoders 514, 517. As set forth more fully hereinafter, the transport module also works with the conditional access module (CAM) 512 to determine whether the subscriber receiving station 110 is permitted to access certain program material. Data from the transport module can also be supplied to external communication module 526.

The CAM 512 functions in association with other elements to decode an encrypted signal from the transport module 508. The CAM 512 may also be used for tracking and billing these services. In one embodiment of the present invention, the CAM 512 is a smart card, having contacts cooperatively interacting with contacts in the IRD 500 to pass information. In order to implement the processing performed in the CAM 512, the IRD 500, and specifically the transport module 508 provides a clock signal to the CAM 512.

Video data is processed by the MPEG video decoder 514. Using the video random access memory (RAM) 536, the MPEG video decoder 514 decodes the compressed video data and sends it to an encoder or video processor 516, which converts the digital video information received from the video MPEG module 514 into an output signal usable by a display or other output device. By way of example, processor 516 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized, and are advantageous if high definition programming is processed.

Audio data is likewise decoded by the MPEG audio decoder 517. The decoded audio data may then be sent to a digital to analog (D/A) converter 518. In one embodiment of the present invention, the D/A converter 518 is a dual D/A converter, one for the right and left channels. If desired, additional channels can be added for use in surround sound processing or secondary audio programs (SAPs). In one embodiment of the invention, the dual D/A converter 518 itself separates the left and right channel information, as well as any additional channel information. Other audio formats may similarly be supported. For example, other audio formats such as multi-channel DOLBY DIGITAL AC-3 may be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microcontroller 510 receives and processes command signals from the remote control 524, an IRD 500 keyboard interface, and/or another input device. The microcontroller receives commands for performing its operations from a processor programming memory, which permanently stores such instructions for performing such commands. The processor programming memory may comprise a read only memory (ROM) 538, an electrically erasable programmable read only memory (EEPROM) 522 or, similar memory device. The microcontroller 510 also controls the other digital devices of the IRD 500 via address and data lines (denoted "A" and "D" respectively, in FIG. 5).

The modem 540 connects to the customer's phone line via the PSTN port 120. It calls, e.g. the program provider, and transmits the customer's purchase information for billing purposes, and/or other information. The modem 540 is controlled by the microprocessor 510. The modem 540 can output data to other I/O port types including standard parallel and serial computer I/O ports.

The present invention also comprises a local storage unit such as the video storage device 532 for storing video and/or audio data obtained from the transport module 508. Video storage device 532 can be a hard disk drive, a read/writable compact disc of DVD, a solid state RAM, or any other storage medium. In one embodiment of the present invention, the video storage device 532 is a hard disk drive with specialized parallel read/write capability so that data may be read from the video storage device 532 and written to the device 532 at the same time. To accomplish this feat, additional buffer memory accessible by the video storage 532 or its controller may be used. Optionally, a video storage processor 530 can be used to manage the storage and retrieval of the video data from the video storage device 532. The video storage processor 530 may also comprise memory for buffering data passing into and out of the video storage device 532. Alternatively or in combination with the foregoing, a plurality of video storage devices 532 can be used. Also alternatively or in combination with the foregoing, the microcontroller 510 can also perform the operations required to store and or retrieve video and other data in the video storage device 532.

The video processing module 516 input can be directly supplied as a video output to a viewing device such as a video or computer monitor. In addition, the video and/or audio outputs can be supplied to an RF modulator 534 to produce an RF output and/or 8 vestigal side band (VSB) suitable as an input signal to a conventional television tuner. This allows the receiver 500 to operate with televisions without a video output.

Each of the satellites 108 comprises a transponder, which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

Preferably, the IRD 500 also receives and stores a program guide in a memory available to the microcontroller 510. Typically, the program guide is received in one or more data packets in the data stream from the satellite 108. The program guide can be accessed and searched by the execution of suitable operation steps implemented by the microcontroller 510 and stored in the processor ROM 538. The program guide may include data to map viewer channel numbers to satellite transponders and service channel identifications (SCIDs), and also provide TV program listing information to the subscriber 122 identifying program events.

The functionality implemented in the IRD 500 depicted in FIG. 5 can be implemented by one or more hardware modules, one or more software modules defining instructions performed by a processor, or a combination of both.

Figure 6:
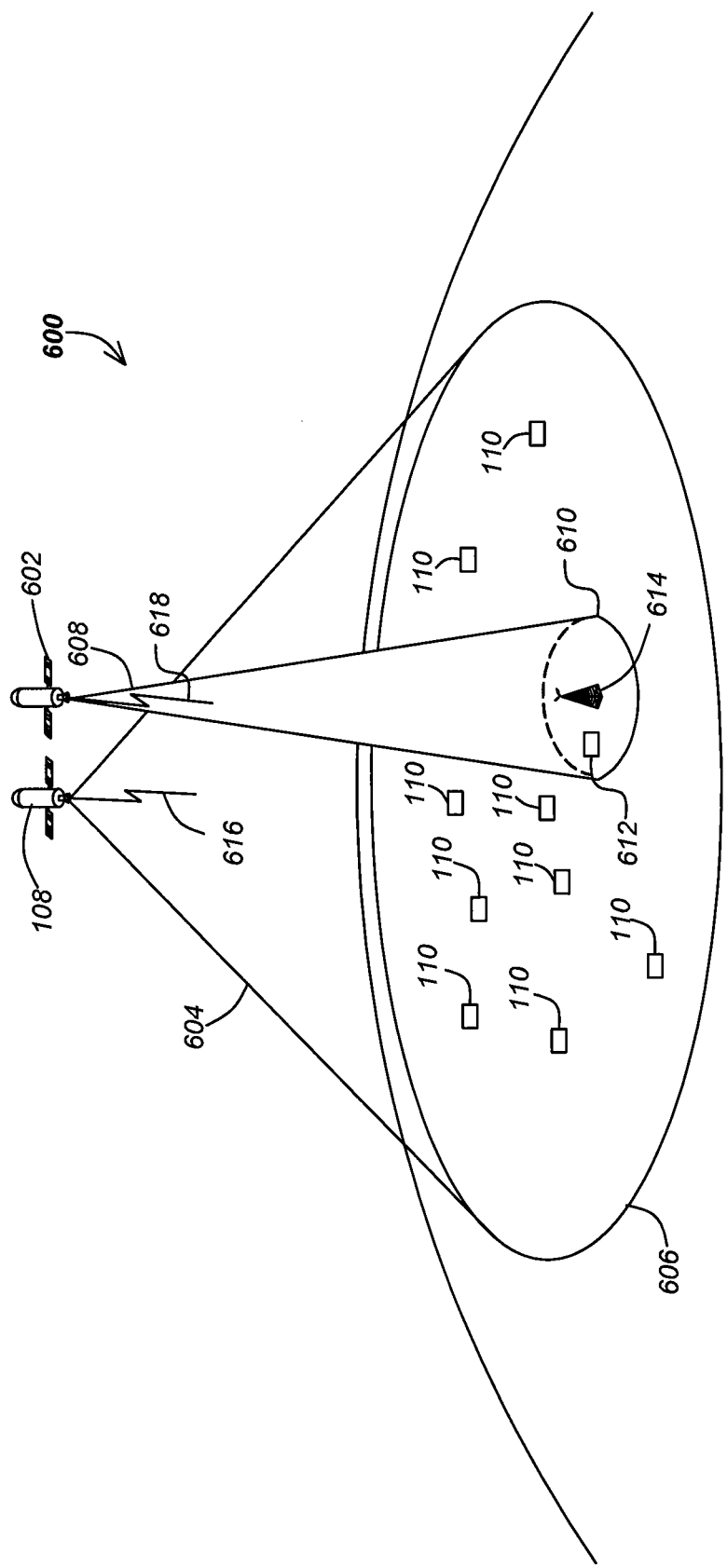
FIG. 6 is an illustration of an embodiment of the present invention using two satellites.

FIG. 6 is a diagram presenting a view of an enhanced video distribution system 600 utilizing spot beams to provide local channel content. In this embodiment, one or more satellites such as satellite 108 broadcast a first signal 616 via beam 604 to provide services to subscribers having receiver stations 110 located within a particular large geographical area 606 such as CONUS. The first signal 616 broadcasts a first set of programs to all subscribers, including receiver stations 110 and receiver station 612. The first signal includes a plurality of service channels, each with a unique service channel identifier (SCID). As described herein, each program in the first set of programs is typically dedicated to a particular service channel when it is being broadcast.

One or more second satellites 602 broadcast a second signal 618 via spot beam 608 to provide services to subscribers having receiver stations 612 located in a particular local area or region 610. The second signal broadcasts at least a second set of programs to subscribers having receiver stations 612 located in the local area or region 610. In one embodiment, the second signal also includes some or all of the first set of programs as well. Like the first signal, the second signal includes a plurality of service channels with unique SCIDs.

Besides content, the second signal 618 differs from the first signal 616 in a fundamental signal characteristic. In one embodiment, the second signal 618 differs from the first signal 616 in frequency. In another embodiment, the second signal 618 differs from the first signal 616 in polarization. In any case, the difference in fundamental signal characteristic allows the first signal 616 and the second signal 618 to be received by the same receiver station 612 and to be distinguishable from one another. However, both the first signal 616 and the second signal 618 share the same channel sharing scheme (i.e. essentially a TDMA scheme with channels denoted by SCID).

Essentially, the boundaries of the local area or region 610 separate subscribers into groups that can be defined in many ways. For example, in one embodiment, the local area or region 610 is an area defined by the locus of locations wherein a signal broadcast by a terrestrial transmitter 614 can be received by receiver stations 612 in the area with a minimum level of quality. Such boundaries can depend on weather and other atmospheric conditions as well as terrain. Hence, the local area or region 610 can be defined according to statistical signal quality. Local area or region 610 can also be a geopolitical boundary, designated according to agreement or subscriber characteristics, such as a designation that the subscriber receive a particular program set.

FIG. 6 illustrates an embodiment wherein the first signal 616 is transmitted by a first satellite 108 and the second signal 618 is transmitted by a second satellite 602. However, each of the satellites 108 and 602 can comprise a plurality of transponders, each operating at a different frequency, and/or transmitting signals at a different polarization. Hence, although FIG. 6 illustrates an embodiment in which the first signal 616 and second signal 618 are transmitted by satellites that are sufficiently proximate to be within the beamwidth of the receiver station's antenna, the present invention could also be implemented with a single satellite transmitting the first signal 616 and the second signal 618 as well.

FIG. 7 is a mapping 700 showing how the program guide information, that is, the program content, is transmitted. The first content 704 (labeled "CONUS MPG CONTENT") is carried on the first signal 616 from the first satellite 108, and the second content 706 (labeled "SPOT BEAM CONTENT") is carried on the second signal 618 from the second satellite 602. The first content 704 includes descriptive information 716 about the first set of programs that are transmitted on the first signal 616. The second content 706 includes descriptive information 718 about the first set of programs that are transmitted on the first signal 616. As the first set of programs is available to the entire service area 606, the descriptive information of 716 and 718 is the same. The first content 704 and second content 706 additionally includes descriptive information (720 and 722) about the second set of programs that are transmitted on the second signal 618. However, as the second set of programs is only available to the service area 610, the descriptive information of 720 is intentionally different than the descriptive information of 722. In the illustrated example, the second set of programs 722 is broadcast on SCIDs 0x49A-0x4FF. The second content 706 includes descriptive information 722 for local channels 1 through 101, while the first content 704 includes descriptive information 720 that does not specifically describe local channels 1 through 101.

Figure 8:
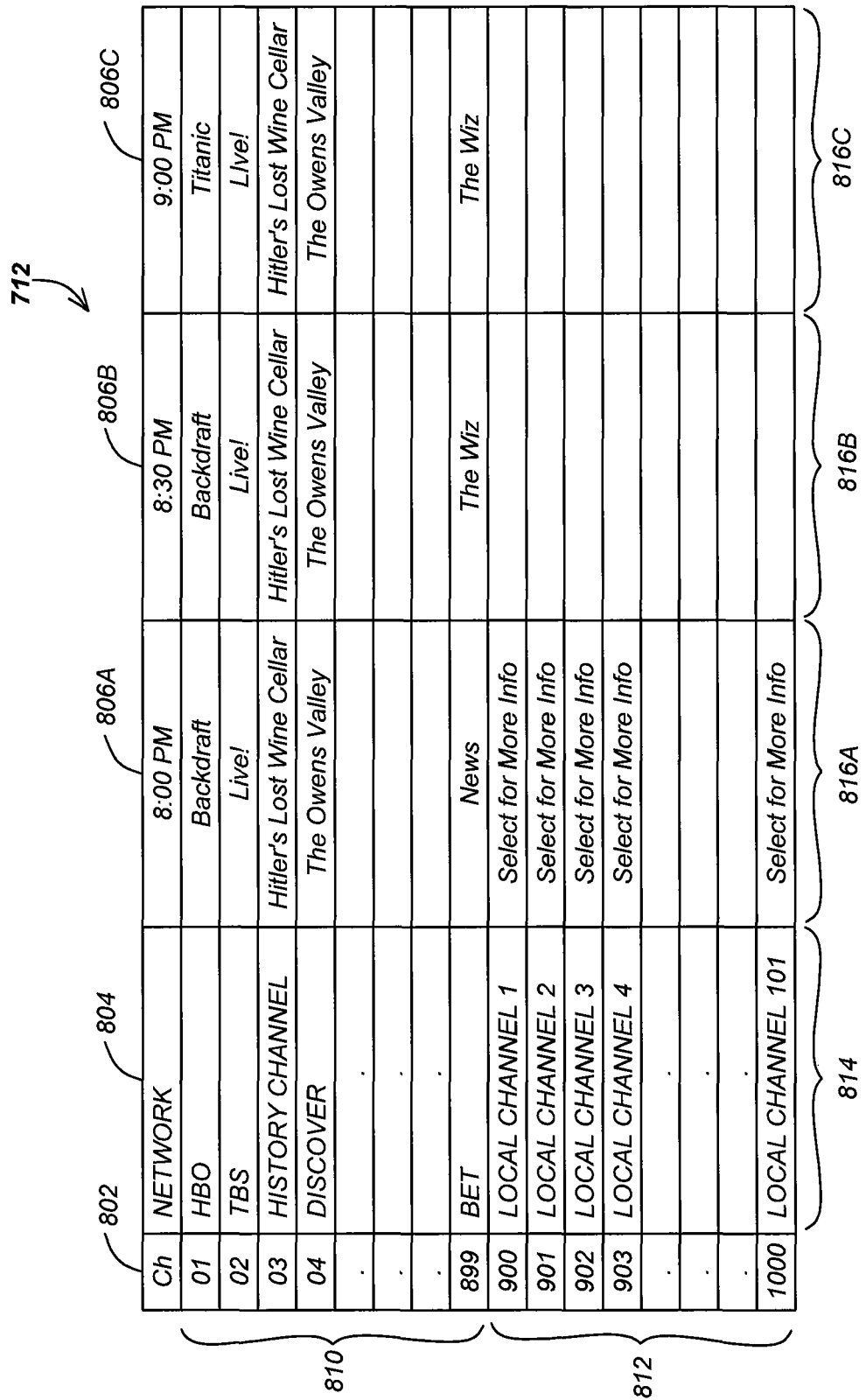
FIG. 8 is a diagram showing one embodiment of a master program guide providing information regarding the first set of programs.

FIG. 8 is a diagram showing one embodiment of the first content 704. In the illustrated embodiment, the first content 704 includes a channel number column 802 indicating viewer channels, a channel descriptor column 804 having channel descriptions 814 to indicate the source of the program provided on the channel, and a plurality of program content descriptor columns 806A-806C having program description information 816A-816C for programming time slots.

In the illustrated embodiment, the first set of programs 810 are presented with specific information regarding each program also presented in the succeeding columns.

In the illustrated embodiment, local channel 1 through local channel 101 814 are presented generically by "surrogate" channels 900-1000. That is, specific program information is not included, but an indication that channels 900-1000 are dedicated to rebroadcast local content is indicated. In one embodiment, information 816A-816C is also provided in program content descriptor columns 806A through 806C to indicate that additional program information regarding these local channels can be obtained by selecting the viewer channel 802 for the local channel of interest. This selection is typically made with the use of a user interface device such as the remote control or keyboard 524.

When the user selects one of channels 810, the transport chip 508 in the IRD 500 finds data packets with the proper SCID, and assembles and prepares them for presentation. However, when the user selects one of the viewer channels dedicated to local programming (e.g. local channels 812), the IRD 500 is configured to receive the second signal 618 from the second satellite 602. This can be accomplished in a number of ways. In one embodiment, the RD 500 is simply tuned to receive a different frequency matching the transmissions from the transponder on the second satellite 602 transmitting the second signal 618. In another embodiment, the receiver station 110 is reconfigured to receive the second signal 618 at a different polarization than the first signal. In yet another embodiment, the receiver station's antenna is mechanically or electronically steered to a second satellite, or a second LNB is selected effectively displacing the beam sensitivity pattern of the receiver station 110 antenna. Alternatively or in addition to the above, the selection of the second signal 618 can be accomplished by a direct command from the user (rather than by the selection of a viewer channel associated with one of the local channels 812).

The second signal 618, includes second program guide information, as manifested by the second content 706. The RD 500 loads this second program guide information, and presents it to the subscriber 112 for viewing.

Figure 9:
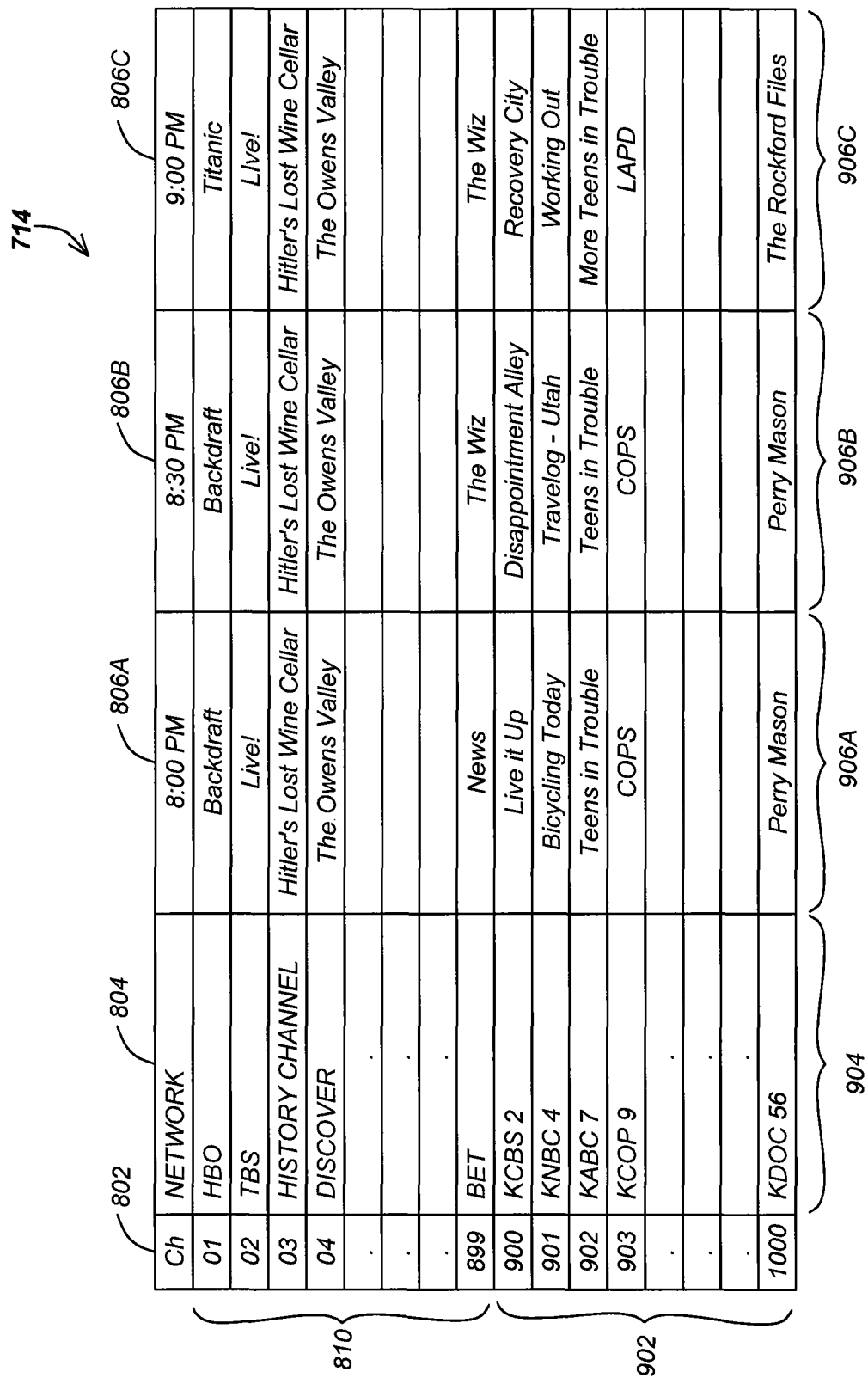
FIG. 9 is a diagram showing one embodiment of a master program guide providing information regarding the second set of programs.

FIG. 9 is a diagram showing one embodiment of the second content 706. In the illustrated embodiment, the second content 706 includes the same information regarding the first set of programs 810. However, in addition, the second content 706 also includes specific information regarding the local channels 1-101. In the place of the generic information presented in FIG. 8, columns 804 and 806A-806C include specific information about the source of the information presented in the viewer channel (e.g. "KCBS 2") and the content information regarding the programs themselves (e.g. "News" or "Perry Mason") 906A-906C.

Figure 10:
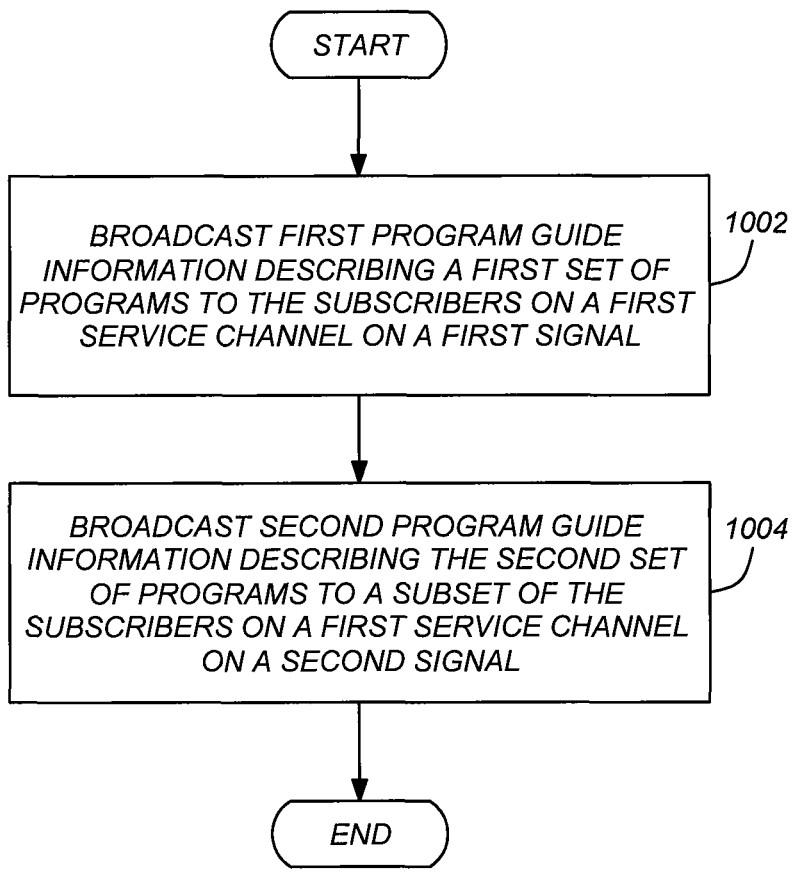
FIG. 10 is a flow chart illustrating exemplary method steps used to practice one embodiment of the present invention.

FIG. 10 is a flow chart illustrating exemplary method steps used to practice one embodiment of the present invention. As shown in block 1002 the satellite 108 broadcasts first program guide information describing a first set of programs to the subscribers (including, for example, those associated with receiver stations 110 and 612) on a first channel of a first signal 616. As shown in block 1004, a second satellite 602 broadcasts second program guide information describing a second set of programs to a subset of the subscribers (e.g. those associated with receiver stations 616 within the local area or region 610) on the first service channel, but on a second signal 618 wherein the a signal characteristic of the first signal and the second signal differ (e.g. polarization, frequency, or coding). Because the first program guide information and the second program guide information are presented on the same service channels, differing program guide information can be presented for each signal without requiring changes to the IRD 500.

Figure 11:
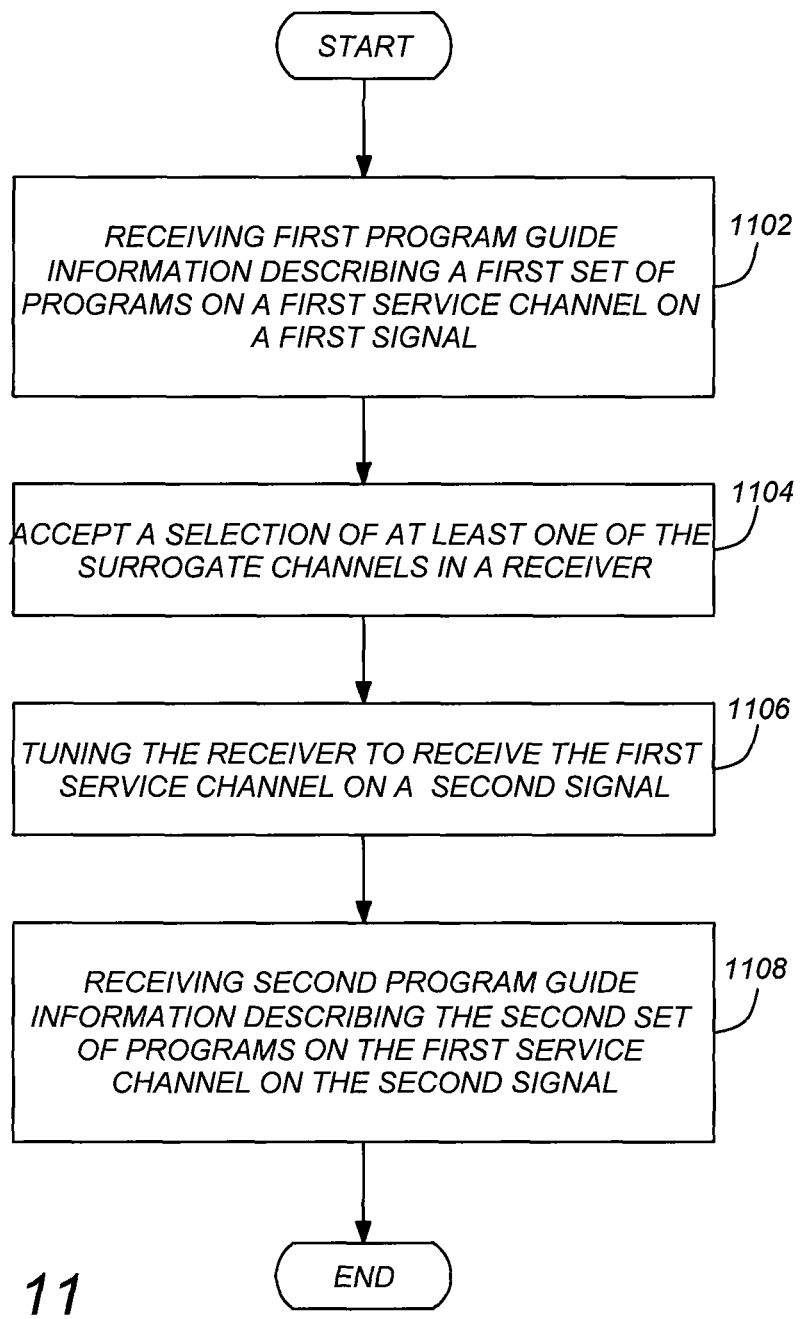
FIG. 11 is a flow chart illustrating exemplary method steps used to practice a second embodiment of the present invention.

FIG. 11 is a flow chart illustrating exemplary method steps used to practice another embodiment of the present invention. First program guide information describing a first set of programs on a first service channel on a first signal is received, as shown in block 1102. The subscriber 112 can select a number of channels from the first program guide (e.g. CONUS MPG). If at least one of the selected channel is one of the surrogate channels 900-1000 dedicated to local programming, the receiver station 612 is tuned to receive second program guide information (e.g. SPOT BEAM MPG) on the first service channel of the second signal 618. The second program guide information is received via the second signal 618 and presented to the subscriber 112. This is depicted in steps 1104-1108.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. In a single content provider system comprising one or more satellites for transmitting a plurality of programs to a plurality of subscribers via satellite transmission, the single content provider system having a first transmitter broadcasting a first signal having a first set of programs and not a second set of programs to a the plurality of subscribers according to a channel sharing scheme having a plurality of service channels distinguished by service channel identifiers, and a second transmitter broadcasting a second signal having the second set of programs according to the same channel sharing scheme, a method of providing second program guide information describing the second set of programs, comprising:

broadcasting the first signal having a first service channel from the system to a first geographical area, the first service channel of the first signal comprising first program guide information describing the first set of programs and not including the second program guide information describing the second set of programs; and broadcasting, at the same time as the first signal, the second signal having the first service channel from the system to a subset of the plurality of subscribers located in a region within the first geographical area, the subset of the plurality of subscribers comprising fewer than all of the plurality of subscribers, the first service channel of the second signal comprising second program guide information describing the second set of programs;

wherein a fundamental signal characteristic of the second signal differs from the fundamental signal characteristic of the first signal, allowing receivers associated with the subset of subscribers to distinguishably receive both the first signal and the second signal.

2. The method of claim 1, wherein the fundamental signal characteristic is carrier frequency, and the first signal is characterized by a first carrier frequency and the second signal is characterized by a second carrier frequency.

3. The method of claim 1, wherein the fundamental signal characteristic is polarization and the first signal is characterized by a first polarization and the second signal is characterized by a second polarization.

4. The method of claim 1, wherein the first program guide information includes information describing at least one surrogate channel.

5. The method of claim 4, wherein a subscriber selection of at least one of the at least one surrogate channels commands reception of the second signal.

6. The method of claim 1, wherein the second signal is a spot beam directed at the subset of subscribers.

7. The method of claim 1, wherein the second set of programs comprise local programs and the second signal is a spot beam directed at a subset of the subscribers that are designated to receive the second set of programs.

8. The method of claim 1, wherein the second signal further includes a portion of the first set of programs and the second program information further describes the portion of the first set of programs.

9. In a single content provider system comprising one or more satellites for transmitting a plurality of programs to a plurality of subscribers via satellite transmission, the single content provider system having a first transmitter broadcasting a first signal having a first set of programs and not a second set of programs to a plurality of subscribers according to a channel sharing scheme having a plurality of service channels distinguished by service channel identifiers, and a second transmitter broadcasting a second signal having the second set of programs according to the same channel sharing scheme, a method of receiving second program guide information describing the second set of programs, comprising the steps of:

receiving the first signal having a first service channel from the system in a first geographical area, the first service channel of the first signal comprising first program guide information describing the first set of programs and not including the second program guide information describing the second set of programs ; and receiving the second signal having the first service channel from the system by a subset of the plurality of subscribers located in a region within the first geographical area, the subset of the plurality of subscribers comprising fewer than all of the plurality of subscribers, the first service channel of the second signal comprising second program guide information describing the second set of programs;

wherein a fundamental signal characteristic of the second signal differs from the fundamental signal characteristic of the first signal, allowing receivers associated with the subset of subscribers to distinguishably receive both the first signal and the second signal, and the first signal and the second signal are broadcast at the same time.

10. The method of claim 9, wherein the fundamental signal characteristic is carrier frequency, and the first signal is characterized by a first carrier frequency and the second signal is characterized by a second carrier frequency.

11. The method of claim 9, wherein the fundamental signal characteristic is polarization and the first signal is characterized by a first polarization and the second signal is characterized by a second polarization.

12. The method of claim 10, wherein the first program guide information includes information describing at least one surrogate channel and the method further comprises the step of:

accepting a selection of at least one of the at least one surrogate channels in a receiver; and receiving the second signal at the second carrier frequency on the first service channel.

13. The method of claim 12, wherein the second signal is a spot beam directed at the receiver.

14. The method of claim 12, wherein the second set of programs are local programs and the second signal is a spot beam directed at a subset of subscribers designated to receive the second set of programs.

15. The method of claim 14, wherein the second signal further includes a portion of the first set of programs and the second program information further describes the portion of the first set of programs.

16. In a single content provider system comprising one or more satellites for transmitting a plurality of programs to a plurality of subscribers via satellite transmission, the single content provider system having a first transmitter broadcasting a first signal having a first set of programs and not a second set of programs to a plurality of subscribers according to a channel sharing scheme having a plurality of service channels distinguished by service channel identifiers, and a second transmitter broadcasting a second signal having the second set of programs according to the same channel sharing scheme to a subset of the subscribers comprising fewer than all of the plurality of subscribers, a receiver for receiving second program guide information describing the second set of programs, comprising:

a user interface for accepting subscriber commands;
a tuner selectably configurable to receive:

the first signal transmitted from the first transmitter to a first geographical area, the first signal having a first service channel comprising first program guide information describing the first set of programs and not including the second program guide information describing the second set of programs; and the second signal transmitted from the second transmitter to a region within the first geographical area to the subset of the plurality of subscribers, the second signal transmitted at the same time as the first signal and having the first service channel, the first service channel of the second signal comprising second program guide information describing the second set of programs;

wherein a fundamental signal characteristic of the second signal differs from the fundamental signal characteristic of the first signal, allowing the receiver to distinguishably receive both the first signal and second signal; and a processor, communicatively coupled to the user interface and the tuner, for retrieving the first program information and the second program information for providing the first and second program information to a presentation device, and for accepting subscriber commands from the user interface.

17. The receiver of claim 16, wherein the fundamental signal characteristic is carrier frequency, and the first signal is characterized by a first carrier frequency and the second signal is characterized by a second carrier frequency.

18. The receiver of claim 16, wherein the fundamental signal characteristic is polarization and the first signal is characterized by a first polarization and the second signal is characterized by a second polarization.

19. The receiver of claim 16, wherein:

the first program guide includes information describing at least one surrogate channel;

the subscriber commands include a command to select at least one of the at least one surrogate channels; and the processor further tunes the tuner to receive the second program guide information in response to the command to select at least one of the at least one surrogate channels.

20. The receiver of claim 19, wherein the second signal is a spot beam directed at the receiver.

21. The receiver of claim 19, wherein the second set of programs are local programs and the second signal is a spot beam directed at a subset of subscribers designated to receive the second set of programs.

22. The receiver of claim 19, wherein the second signal further includes a portion of the first set of programs and the second program information further describes the portion of the first set of programs.

23. A single content provider system, comprising one or more satellites for transmitting a plurality of programs to a plurality of subscribers via satellite transmission, comprising:

a compiler, configured to segment the plurality of programs into a first set of programs and a second set of programs, and to generate first program guide information describing the first set of programs and second program guide information describing the second set of programs;

a first transmitter, communicatively coupled to the compiler, for transmitting a first signal having the first set of programs and not the second set of programs to the plurality of subscribers in a first geographical area according to a channel sharing scheme having a plurality of service channels distinguished by service channel identifiers, the first signal further comprising a first service channel comprising first program guide information describing the first set of programs and not including second program guide information describing the second set of programs; and a second transmitter, communicatively coupled to the compiler, for transmitting a second signal at the same time as the first signal to a subset of the plurality of subscribers located in a region within the first geographical area, the subset of the plurality of subscribers comprising fewer than all of the plurality of subscribers, the second signal having the first service channel comprising the second program guide information describing the second set of programs;

wherein a fundamental signal characteristic of the second signal differs from the fundamental signal characteristic of the first signal, allowing receivers associated with the subset of subscribers to distinguishably receive both the first signal and the second signal.

24. The apparatus of claim 23, wherein the fundamental signal characteristic is carrier frequency, and the first signal is characterized by a first carrier frequency and the second signal is characterized by a second carrier frequency.

25. The apparatus of claim 23, wherein the fundamental signal characteristic is polarization and the first signal is characterized by a first polarization and the second signal is characterized by a second polarization.

26. The apparatus of claim 23, wherein the first transmitter comprises a first transponder and the second transmitter comprises a second transponder.

27. The apparatus of claim 26, wherein the first transponder is disposed on the first satellite and the second transponder is disposed on the second satellite.

28. The apparatus of claim 23, wherein the first transponder is disposed on a first satellite and the second transponder is disposed on a second satellite, and wherein the first satellite and the second satellite are disposed within a beamwidth of a receiver antenna.

29. The apparatus of claim 23, wherein the first program guide information includes information describing at least one surrogate channel.

30. The apparatus of claim 29, wherein a subscriber selection of at least one of the at least one surrogate channel commands reception of the second signal.

31. The apparatus of claim 23, wherein the second signal is a spot beam directed at a subset of subscribers.

32. The apparatus of claim 23, wherein the second set of programs comprise local programs and the second signal is a spot beam directed at a subset of the subscribers that are designated to receive the second set of programs.

33. The apparatus of claim 23, wherein the second signal further includes a portion of the first set of programs and the second program information further describes a portion of the first set of programs.

34. In a single content provider system comprising one or more satellites for transmitting a plurality of programs to a plurality of subscribers via satellite transmission, the single content provider system having a first transmitter transmitting a first signal having a first set of programs and not a second set of programs, each of the programs in the first set of programs transmitted on an associated one of a plurality of service channels distinguished by service channel identifiers as defined according to a channel sharing scheme, to a plurality of subscribers and a second transmitter transmitting a second signal having the second set of programs according to the same channel sharing scheme, a method of providing program guide information describing the second set of programs, comprising:

broadcasting the first signal having a first signal channel from the system to a first geographical area, the first service channel of the first signal comprising first program guide information describing the first set of programs and not including second program guide information describing the second set of programs to the plurality of subscribers; and broadcasting, at the same time as the first signal, the second signal having the first service channel from the system to a subset of the plurality of subscribers located in a region within the first geographical area, the subset of the plurality of subscribers comprising fewer than all of the plurality of subscribers, the first service channel of the second signal comprising second program guide information describing the second set of programs;

wherein a fundamental signal characteristic of the second signal differs from the fundamental signal characteristic of the first signal, allowing receivers associated with the subset of subscribers to distinguishably receive both the first signal and the second signal.

35. The method of claim 1, wherein each of the programs in the first set of programs are transmitted on an associated one of a plurality of service channels, and each of the second set of programs are transmitted on an associated one of the plurality of service channels.

36. The method of claim 9, wherein each of the programs in the first set of programs are transmitted on an associated one of a plurality of service channels, and each of the second set of programs are transmitted on an associated one of the plurality of service channels.

37. The receiver of claim 16, wherein each of the programs in the first set of programs are transmitted on an associated one of a plurality of service channels, and each of the second set of programs are transmitted on an associated one of the plurality of service channels.

38. The apparatus of claim 23, wherein each of the programs in the first set of programs are transmitted on an associated one of a plurality of service channels, and each of the second set of programs are transmitted on an associated one of the plurality of service channels.

* * * * *